United States Patent
Huggins

(10) Patent No.: US 9,489,841 B1
(45) Date of Patent: Nov. 8, 2016

(54) PORTABLE MULTI-FUNCTION ROADWAY BARRIER

(71) Applicant: James Damian Huggins, Mount Juliet, TN (US)

(72) Inventor: James Damian Huggins, Mount Juliet, TN (US)

(*) Notice: Subject to any disclaimer, the term of this patent is extended or adjusted under 35 U.S.C. 154(b) by 0 days.

(21) Appl. No.: 15/013,107

(22) Filed: Feb. 2, 2016

Related U.S. Application Data

(60) Provisional application No. 62/181,237, filed on Jun. 18, 2015.

(51) Int. Cl.
| | | |
|---|---|---|
| *G08G 1/01* | (2006.01) | |
| *G08G 1/056* | (2006.01) | |
| *B60Q 7/00* | (2006.01) | |
| *G08G 1/0955* | (2006.01) | |
| *E01F 13/02* | (2006.01) | |

(52) U.S. Cl.
CPC .............. *G08G 1/056* (2013.01); *B60Q 7/00* (2013.01); *E01F 9/30* (2016.02); *E01F 13/02* (2013.01); *G08G 1/0955* (2013.01)

(58) Field of Classification Search
CPC ....... B60Q 7/00; B60Q 1/2611; E01F 13/02; G08G 1/0955
USPC ............ 340/935, 908, 908.1, 473; 116/63 P
See application file for complete search history.

(56) References Cited

U.S. PATENT DOCUMENTS

| | | | |
|---|---|---|---|
| 2,591,888 A | 4/1952 | Steffen | |
| 3,729,706 A | 4/1973 | Hein | |
| 4,447,802 A | 5/1984 | Bose | |
| 4,535,331 A | 8/1985 | Koenig | |
| 4,543,905 A | 10/1985 | McKenney | |
| 4,616,225 A | 10/1986 | Woudenberg | |
| 4,977,697 A | 12/1990 | Genick | |
| 5,265,556 A | 11/1993 | Hall | |
| 5,400,019 A | 3/1995 | Riscoe, Jr. | |
| 5,422,638 A * | 6/1995 | Singer | G08G 1/095 116/63 P |
| 5,729,215 A | 3/1998 | Jutras | |
| 5,760,686 A | 6/1998 | Toman | |
| 5,986,576 A | 11/1999 | Armstrong | |
| 6,118,388 A | 9/2000 | Morrison | |

(Continued)

FOREIGN PATENT DOCUMENTS

| | | |
|---|---|---|
| GB | 2465214 | 5/2010 |
| GB | 2486075 | 6/2012 |

(Continued)

*Primary Examiner* — John A Tweel, Jr.
(74) *Attorney, Agent, or Firm* — Matthew M. Googe; Robinson IP Law, PLLC

(57) ABSTRACT

A roadway barrier is provided for detecting a dangerous traffic condition. The roadway barrier includes a control module comprising at least one processor, a computer readable storage medium, and executable instructions stored on the computer readable storage medium; a display in communication with the control module; and at least one sensor oriented to measure data related to an approaching vehicle. The roadway barrier is positioned adjacent a safety zone such that the at least one sensor is oriented in a direction to detect traffic approaching the adjacent safety zone. The control module receives data from the at least one sensor related to a speed and direction of an approaching vehicle and determines, based on a speed, distance, predetermined reactionary response times, road surface drag factors and direction of the vehicle whether the stopping distance of the vehicle is estimated to be capable of stopping prior to entering the safety zone.

16 Claims, 12 Drawing Sheets

(56) References Cited

U.S. PATENT DOCUMENTS

| | | |
|---|---|---|
| 6,382,802 B1 | 5/2002 | Goodman |
| 6,559,774 B2 | 5/2003 | Bergan et al. |
| 6,637,904 B2 | 10/2003 | Hernandez |
| 6,707,389 B2 | 3/2004 | Pederson |
| 6,911,917 B2 * | 6/2005 | Higgs .................... B60Q 7/00 340/908 |
| 7,030,777 B1 | 4/2006 | Nelson et al. |
| 7,230,546 B1 | 6/2007 | Nelson et al. |
| 7,461,957 B2 | 12/2008 | Thompson et al. |
| 7,538,688 B1 | 5/2009 | Stewart |
| D596,064 S | 7/2009 | Marzette et al. |
| D598,317 S | 8/2009 | Marzette et al. |
| 7,672,782 B2 | 3/2010 | Mead et al. |
| 8,164,483 B1 | 4/2012 | Phillips |
| 8,201,979 B2 | 6/2012 | Deighton et al. |
| 8,237,555 B2 | 8/2012 | McCarthy |
| 8,262,248 B2 | 9/2012 | Wessel |
| 8,319,662 B1 | 11/2012 | Bontemps et al. |
| 8,429,841 B1 * | 4/2013 | Keller .................... G09F 27/007 40/612 |
| 8,587,453 B2 | 11/2013 | Cripps |
| 8,638,209 B1 | 1/2014 | Oskroba et al. |
| 8,659,443 B2 | 2/2014 | Mandel |
| 2008/0129543 A1 | 6/2008 | Lee |
| 2009/0058680 A1 | 3/2009 | Benn |
| 2011/0090677 A1 | 4/2011 | Fett et al. |
| 2014/0035737 A1 | 2/2014 | Rashid et al. |
| 2015/0054660 A1 | 2/2015 | Simmons |

FOREIGN PATENT DOCUMENTS

| | | |
|---|---|---|
| JP | 2004251869 | 9/2004 |
| WO | WO2009032859 | 3/2009 |
| WO | WO2014014280 | 1/2014 |

* cited by examiner

PORTABLE MULTI-FUNCTION ROADWAY BARRIER

CROSS-REFERENCE TO RELATED APPLICATION

This application claims priority to U.S. Patent Application Ser. No. 62/181,237 to J. Damian Huggins for a Portable Multi-Function Roadway Barrier, which was filed on Jun. 18, 2015, the contents of which are incorporated herein by reference in its entirety.

FIELD

This disclosure relates to the field of traffic safety devices. More particularly, this disclosure relates to a portable roadway safety device for displaying information and alerts to traffic and pedestrians for detecting dangerous traffic conditions.

BACKGROUND

Various traffic signs and roadway barriers exist that warn motorists of approaching traffic conditions. For example, reflective traffic barrels, A-frames, and other various traffic devices may be deployed to warn drivers of various traffic hazards. Larger display signs may also be employed to display messages to motorists regarding approaching traffic hazards.

While these devices may provide visual alerts, they are typically cumbersome and require great effort to set up, making them less suitable for instances where rapid deployment of a visual barrier is desired, such as deployment by police or other emergency vehicles, or roadside work crews. Further, these devices are only designed to continuously warn approaching motorists and are not designed to warn any person standing near the device of an approaching traffic hazard, such as a vehicle entering into a hazardous area.

Other driver alert systems exist for warning drivers that a dangerous condition exists. For example, various vehicle systems detect a speed and path of vehicles surrounding a moving vehicle along with lane lines and other surrounding elements to warn a driver that a dangerous condition exists. However, these systems are active in moving vehicles, and no such system exists to alert an approaching vehicle may pose a hazard to a stationary vehicle or area adjacent a roadway.

Attempts have been made to combine traffic barriers with an alert system for persons located within a hazard zone. For example, U.S. Pat. No. 7,230,546 describes an apparatus for generating an alert when incursion into a work zone occurs. However, this system requires that barriers be set up at various distances away from a hazard zone and only provides an alert once an incursion into that zone has been detected. Additionally, frequent false alarms may result from the general detection of a vehicle incursion into a safety zone without determining a speed and direction of the vehicle to evaluate whether that vehicle poses a potential hazard. Other attempts have been made to create alert systems, however, none are capable of evaluating information related to an approaching vehicle and determining whether a hazardous situation exists.

What is needed, therefore, is a roadway barrier that is rapidly deployable and provides a combination of a visual reflective surface with LED directional control, to visually alert oncoming motorists, and an audible alert function to warn a person in proximity to the roadway barrier of an unsafe traffic condition.

SUMMARY

The above and other needs are met by a roadway barrier having: a control module comprising at least one processor, a computer readable storage medium, and executable instructions stored on the computer readable storage medium; a display including a dynamic display panel housed within a case, the display in communication with the control module; and at least one sensor in communication with the control module for measuring data related to at least a speed, distance, and direction of a vehicle, the sensor selected from the group consisting of radar, LIDAR, or a camera, the at least one sensor oriented to measure data related to an approaching vehicle. The roadway barrier is positioned adjacent a safety zone such that the at least one sensor is oriented in a direction to detect traffic approaching the adjacent safety zone. The control module receives data from the at least one sensor related to a speed and direction of an approaching vehicle and determines, based on a speed, distance, predetermined reactionary response times, road surface drag factor calculations, and direction of the vehicle whether the stopping distance of the vehicle is estimated to be capable of stopping prior to entering the safety zone adjacent the portable roadway barrier.

In one embodiment, the portable barrier further includes a detachable reflective panel including a reflective design hingedly attached to the case of the display. In a deployed configuration the reflective design of the reflective panel is displayed in a direction of an approaching vehicle, and in a closed configuration the reflective panel is folded about the hinge such that the reflective panel substantially covers the display of the portable roadway barrier.

In another embodiment, the portable barrier includes a collapsible base for supporting the portable roadway barrier. In yet another embodiment, the portable barrier further includes a mount formed on the case of the display configured to attach the display to an existing roadway barrier.

In one embodiment, when the control module determines that an approaching vehicle will enter the safety zone adjacent the portable roadway barrier, the control module activates a visual alert on the display towards a driver of the approaching vehicle.

In another embodiment, the portable barrier includes a camera having a field of view oriented toward traffic approaching the portable roadway barrier, and an algorithm on the control module for detecting one or more roadway markings and approaching vehicles within the field of view of the camera and determining whether the approaching vehicle is estimated to enter the safety zone based on a path of an approaching vehicle relative to the one or more roadway markings.

In yet another embodiment, the portable roadway barrier further includes an ambient conditions sensor for measuring data related to weather conditions, wherein the control module further determines whether the approaching vehicle is estimated to enter the safety zone based on measured weather conditions.

In one embodiment, the one or more sensors are attached to the edge of the case of the display within a sensor housing. In another embodiment, the one or more sensors and the control module are affixed to an emergency vehicle in proximity to the portable roadway barrier. In yet another embodiment, the display is affixed to an exterior of the emergency vehicle.

In one embodiment, the roadway barrier further includes a speaker in communication with the control module, wherein when the control module determines that the vehicle is estimated to enter the safety zone adjacent the portable roadway barrier an audible alert is emitted from the speaker.

In another embodiment, the roadway barrier further includes a second sensor oriented towards the safety zone such that the second sensor collects data related to a position of one or more objects in proximity to the roadway barrier, the one or more objects selected from the group consisting of one or more traffic barriers, one or more vehicles, one or more people, or roadway markings. The control module further receives data related to a position of the one or more objects in proximity to the roadway barrier and further determines, based on a position of the one or more objects in proximity to the roadway barrier whether the vehicle is estimated to collide with the one or more objects in proximity to the roadway barrier.

In one embodiment, the roadway barrier further includes a communications module in electronic communication with the control module for transmitting an alert to one or more remote devices when the control module determines that a vehicle is estimated to enter the safety zone adjacent the portable roadway barrier.

In another embodiment, the roadway barrier includes a GPS module for determining a location of the roadway barrier, wherein the control module determines a speed limit of a road based on a location of the roadway barrier and further determines whether an approaching vehicle poses a hazard based on a speed of the approaching vehicle relative to the speed limit of the road.

In yet another embodiment, the at least one sensor is mounted to a stationary emergency response vehicle, the stationary emergency response vehicle located in proximity to the roadway barrier and within the safety zone, and the control module receives data from the at least one sensor mounted to the stationary emergency response vehicle related to a speed and direction of an approaching vehicle and determines, based on a speed, distance, and direction of the vehicle whether the vehicle is estimated to pass within an unsafe distance from the stationary emergency response vehicle.

In a second aspect, a method of detecting an unsafe traffic condition is provided including the steps of: providing a safety zone adjacent a roadway; providing a roadway barrier adjacent the safety zone, the roadway barrier including one or more sensors for detecting data related to a speed and direction of a vehicle approaching the safety zone and a display including a dynamic display panel; transmitting the data related to an approaching vehicle to a control module in communication with the one or more sensors of the roadway barrier; determining whether the approaching vehicle will enter the safety zone based on the detected speed and direction of the approaching vehicle; and creating an alert on the display in response to a determination that the approaching vehicle will enter the safety zone.

In a third aspect, a portable roadway barrier is provided including a dynamic display panel including a case and a display for providing a visual alert, the case including a hinge attached along an edge of the case, a reflective panel attached to the hinge of the case of the dynamic display panel, a collapsible base for supporting the dynamic display panel and the attached reflective panel, a speaker positioned adjacent the dynamic display panel, one or more sensors adjacent the portable roadway barrier for detecting a speed and direction of an approaching vehicle, the one or more sensors selected from the group consisting of radar, LIDAR, or a camera, and a control module in communication with the one or more sensors, the control module comprising at least one processor, a computer readable storage medium, and executable instructions stored on the computer readable storage medium. In a portable configuration the reflective panel folds adjacent to the display of the dynamic display panel, and in a deployed configuration the dynamic display panel and reflective panel provide a reflective barrier panel and directional/messaging visual display panel to an oncoming vehicle. When the portable roadway barrier is in a deployed configuration one or more sensors affixed to the portable roadway barrier determine that the speed and direction of the oncoming vehicle pose a hazard, an audible and visual alert is emitted by the speaker and the LED panel to alert a person in proximity to the portable barrier that a hazardous condition exists.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A roadway barrier is provided for alerting approaching vehicles to objects or areas along a roadside. The roadway barrier is further configured to determine whether an approaching vehicle may enter or pass dangerously close to a hazardous area based on various data measured by the roadway barrier including the approaching vehicle's speed and direction. By evaluating the at least speed and direction of the approaching vehicle, the roadway barrier may estimate a path of the approaching vehicle and, if that path is estimated to bring the vehicle within the hazardous area, create an alert to both the approaching vehicle and any persons in proximity to the hazardous area.

Figure 1:
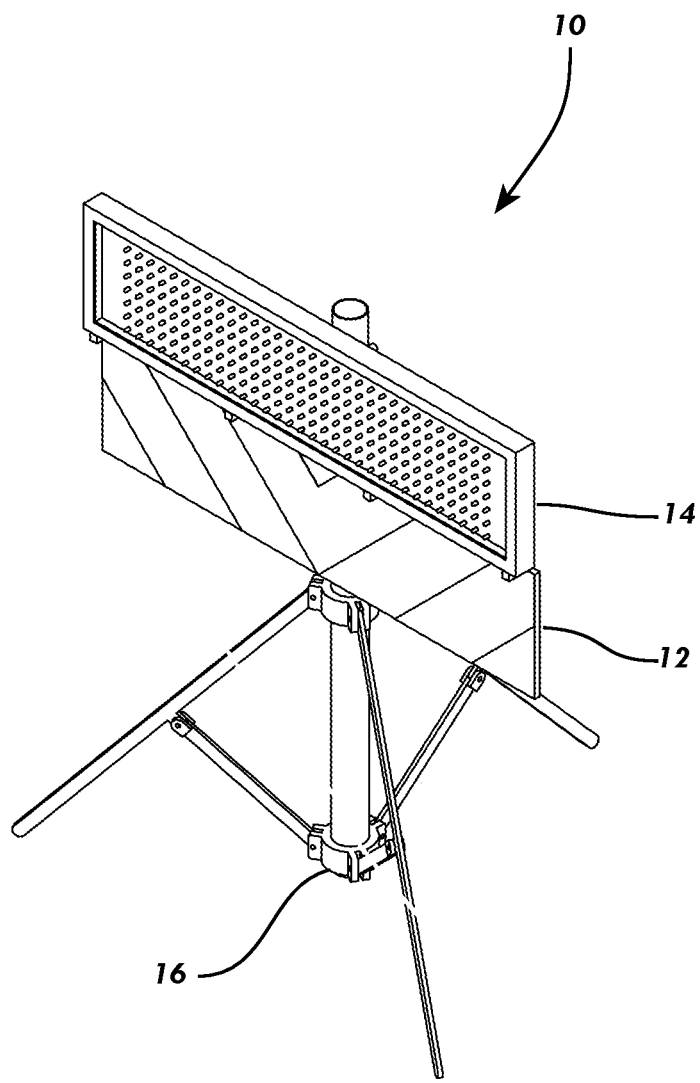
FIG. 1 illustrates a portable roadway barrier according to one embodiment of the disclosure.
Figure 2:
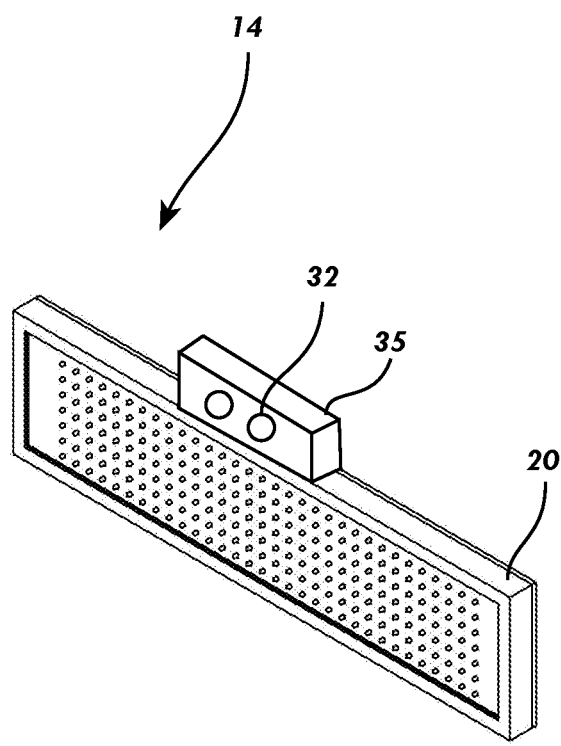
FIGS. 2-5 illustrate a dynamic display panel according to one embodiment of the disclosure.

FIG. 1 shows a basic embodiment of a portable roadway barrier 10 of the present disclosure that includes a reflective panel 12 and a dynamic display panel 14. The reflective panel 12 and dynamic display panel 14 are removably attached to each other atop a base 16. The portable roadway barrier 10 further includes one or more sensors 32 mounted to the barrier 10 for detecting approaching vehicles wherein the barrier 10 provides an alert if a detected approaching vehicle poses a threat to persons or objects in proximity to the portable roadway barrier 10. The portable roadway barrier 10 may provide a combination alert by providing a visual alert to approaching motorists as well as an audible alert to users in proximity to the portable roadway barrier 10.

Figure 3:
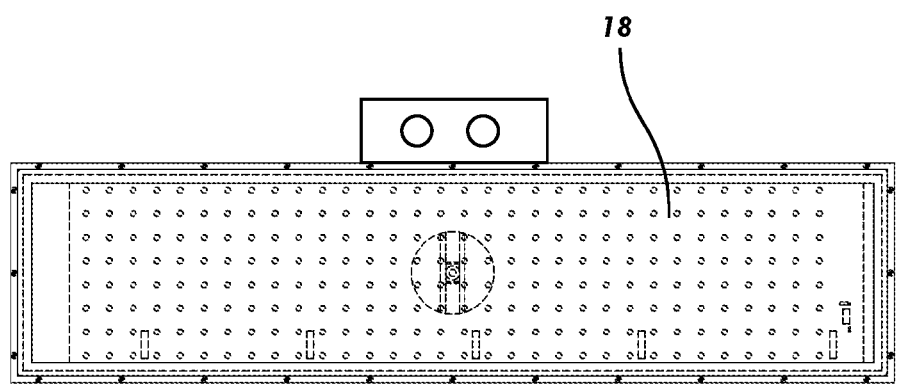
Figure 4:
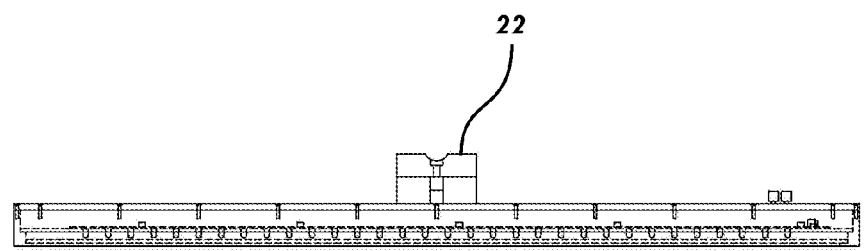
Figure 5:
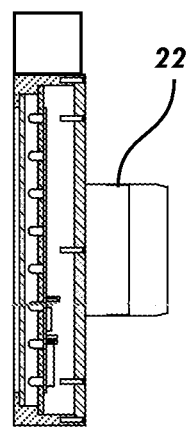

The reflective panel 12 and dynamic display panel 14 together form a portable visual element for providing visual indications to motorists regarding approaching hazards and other road conditions. The dynamic display panel 14 is configured to display various information such as flashing alerts, sequential directional arrows or chevrons, or word messages. The dynamic display panel 14 includes a display 18 (FIG. 3) configured to receive and display an input, such as an LED display comprising a plurality of light emitting diodes, LCD display, or other like displays.

Referring now to FIGS. 2-5, the dynamic display panel 14 is configured to display pre-configured messages, such as flashing messages, animated directional arrows, or text, characters, numbers and symbols or alternatively to receive a custom message received as an input from an external source to the dynamic display panel 14. The dynamic display panel 14 may receive messages via a wired communication with an external device, such as a personal computer or portable device, or via a wireless communication with a device via a wireless communication protocol such as Bluetooth, WiFi, cellular data, or other like wireless transmissions.

The display 18 of the dynamic display panel 14 is housed within a case 20. The case 20 is formed of a metal, plastic, composite, or other like material, and is configured to substantially protect the display 18 from the surrounding environment. The case may include a transparent cover such that the display 18 is substantially visible from outside of the case 20, the transparent cover being formed of a polycarbonate, glass, or other like transparent materials. The case 20 includes a mount 22 formed thereon for securing the case 20 to the base 16. The mount 22 may further be configured to attach to various existing traffic barriers such as a reflective barrel, A-frame type barrier, or other various traffic devices.

The reflective panel 12 is preferably formed of a rigid and lightweight material, such as a metal, polymer, or other like material. The reflective panel 12 includes a reflective design such that the reflective panel is visible to an approaching motorist. For example, FIG. 1 illustrates the reflective panel 12 including a plurality of reflective stripes, however, it is also understood that various other fixed visual displays may be formed on the reflective panel 12. The reflective panel 12 preferably provides at least 270 square inches of retro-reflective area to provide a substantial visual alert to approaching motorists.

Figure 6:
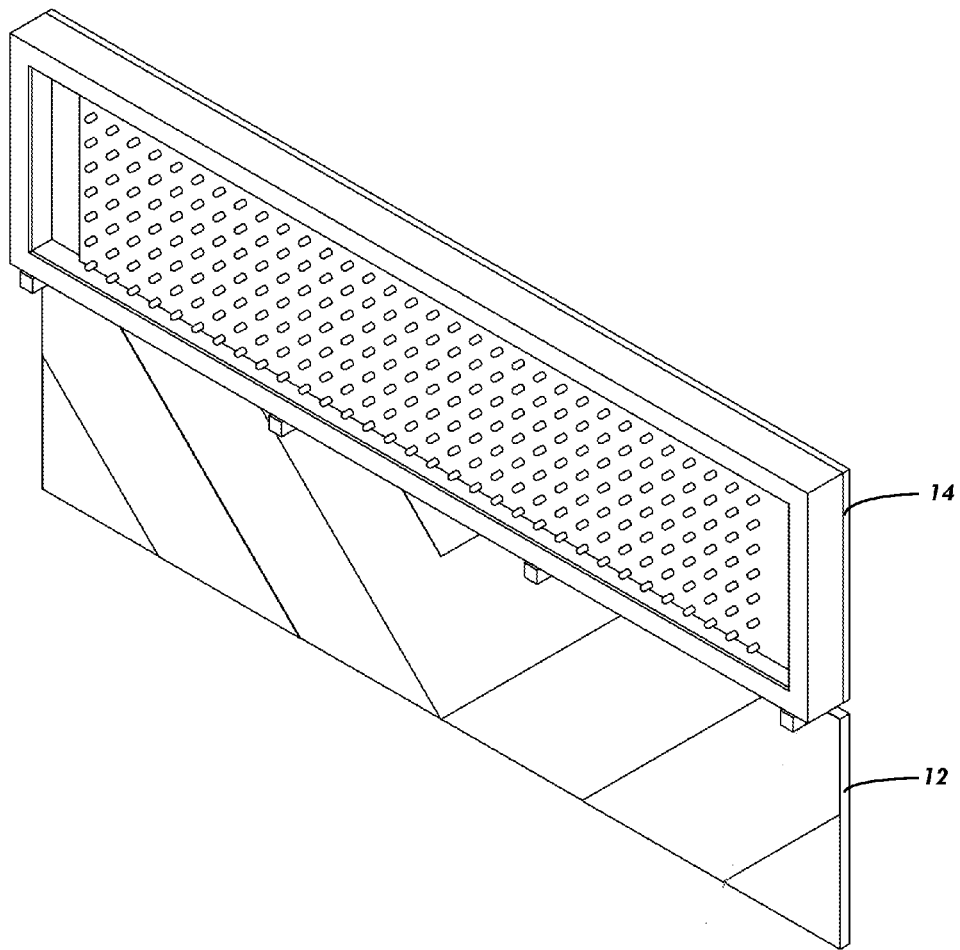
FIGS. 6-8 illustrate a reflective panel and dynamic display panel according to one embodiment of the disclosure.
Figure 7:
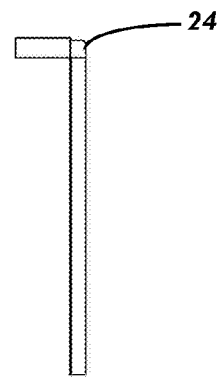
Figure 8:
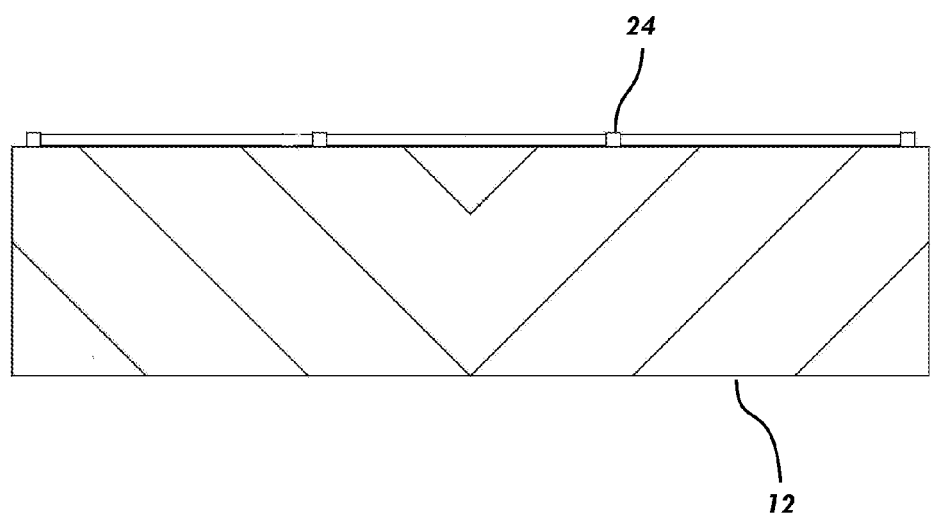

The reflective panel 12 is preferably attached to the case 20 with a hinge 24, as shown in FIGS. 6-8. The hinge 24 is located along and attached to a bottom portion of the case 20 such that the reflective panel substantially hangs from the case 20 when the reflective panel 12 is in an open position. In a closed position, the reflective panel 12 pivots about the hinge 24 such that the reflective panel 12 folds adjacent to the display 18 of the dynamic display panel 14. In the folded position the reflective panel 12 substantially covers the transparent cover and display 18 such that the display 18 is substantially protected. Further, the portable roadway barrier 10 is portable in the folded position.

Figure 9:
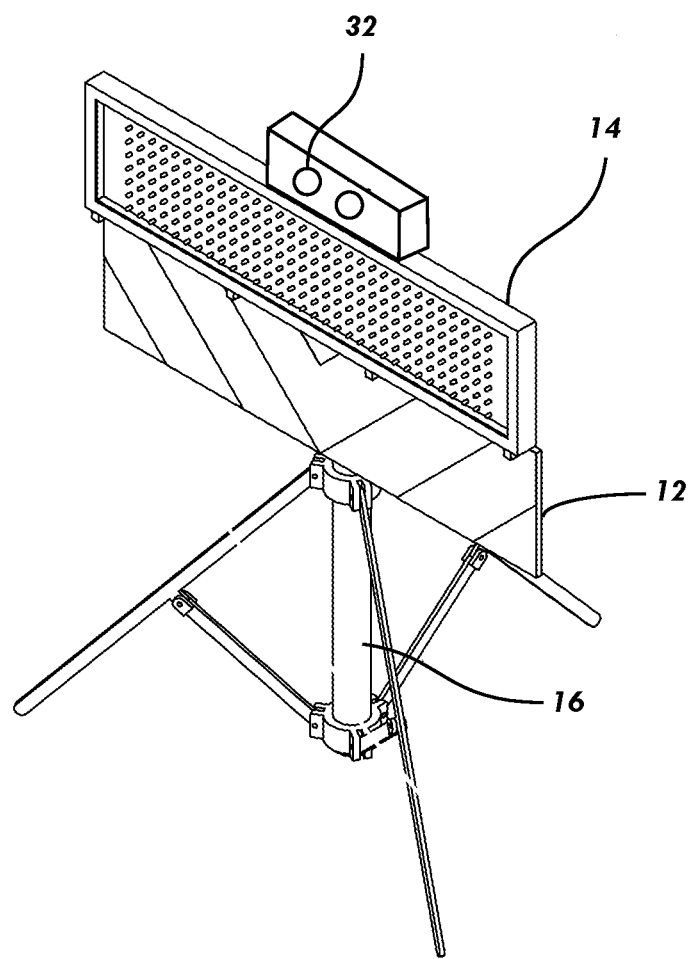
FIGS. 9-11 illustrate a portable roadway barrier and base according to one embodiment of the disclosure.
Figure 10:
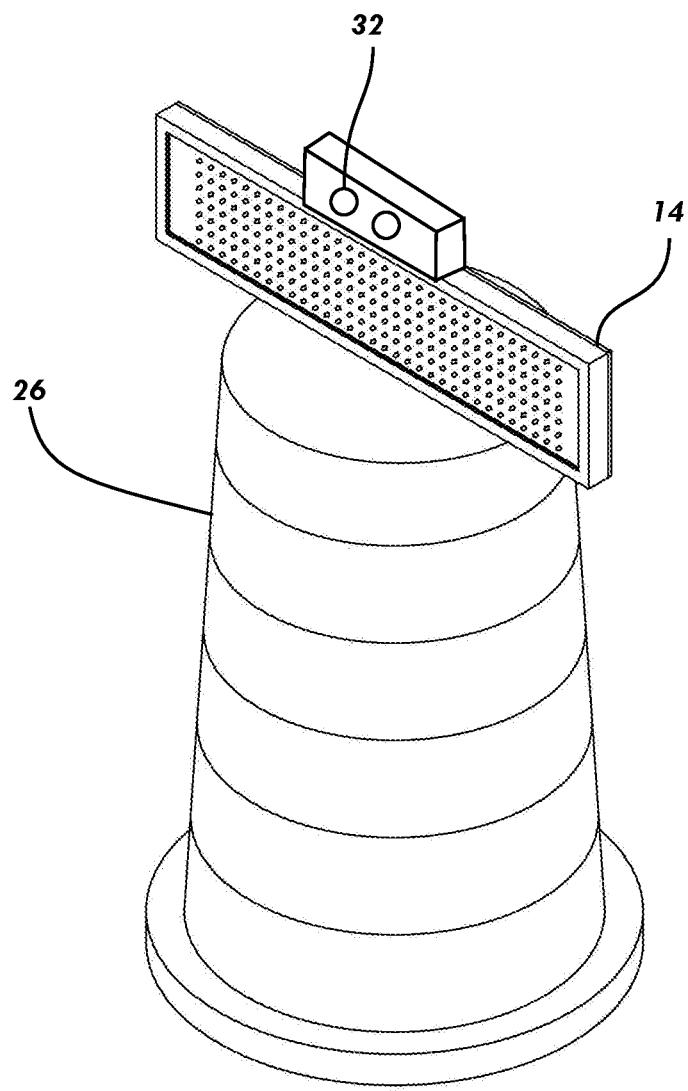
Figure 11:
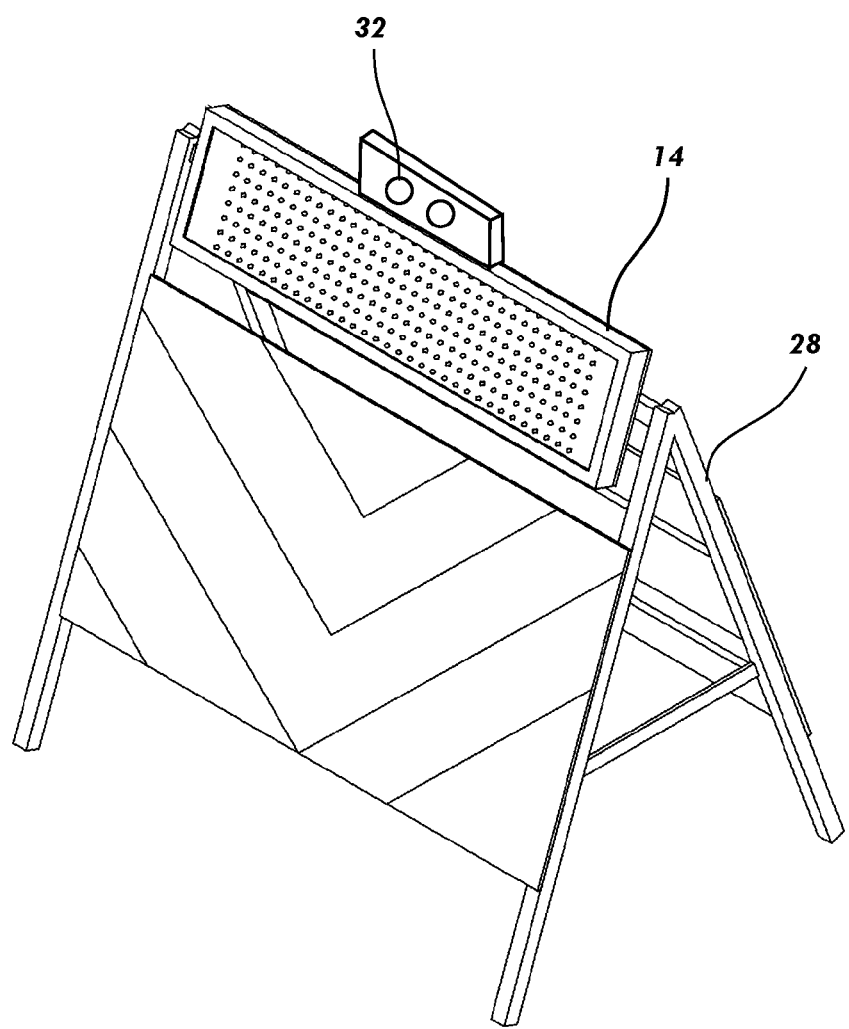

Referring now to FIGS. 9-11, the dynamic display panel 14 and reflective panel 12 may be secured to one another adjacent the base 16 such that the dynamic display panel 14 and reflective panel 12 are supported by the base 16. FIG. 9 illustrates the base being formed of a foldable tripod 16 that is substantially portable. However, it is also understood that the base 16 may be formed of other like portable support structures. Alternatively, the portable roadway barrier 10 may be attached to other various objects, such as emergency response vehicles or other existing roadway objects.

Alternatively, the reflective panel 12 may be detached from the case 20 of the dynamic display panel 14 so that the dynamic display panel 14 may be attached to existing barriers or objects. For example, FIGS. 10 and 11 illustrate the dynamic display panel 14 attached to a reflective barrel 26 or an A-frame barrier 28. The mount 22 of the case 20 may be configured to attach to a portion of the barrel 26 or A-frame barrier 28, such as where an existing flashing light is attached to the barrel 26 or A-frame barrier 28.

Approaching Hazard Detection and Alert

In addition to providing a visual alert to oncoming motorists or traffic, the portable roadway barrier 10 is also configured to detect approaching traffic and vehicles and issue an audible alert to a person in proximity to the portable roadway barrier 10 in the event that the roadway barrier 10 detects an unsafe approaching motorist or traffic condition.

Figure 12:
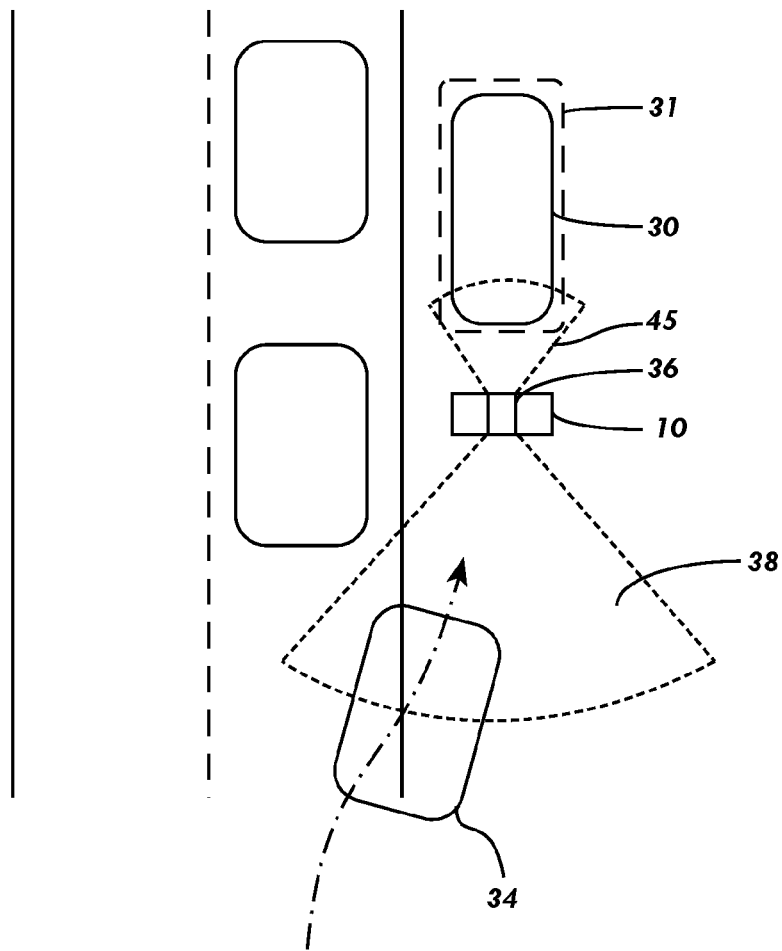
FIG. 12 shows a portable roadway barrier according to one embodiment of the disclosure.

Referring now to FIG. 12, the portable roadway barrier 10 may be positioned adjacent to a safety zone 30. The safety zone 30 may include a construction area, pedestrian crossing, or a stopped vehicle such as a stranded motorist or pulled-over emergency vehicle, and may further define a desired buffer area surrounding the safety zone 30. The portable roadway barrier 10 includes one or more sensors 32 affixed to the portable roadway barrier 10 for detecting an approaching vehicle 34 that may pose a hazard to a person in proximity to the portable roadway barrier 10. The one or more sensors may be affixed to or positioned within the case 20, such as within a sensor housing 35 attached adjacent the case 20 of the display panel 14. The sensor housing 35 may be adjustable relative to the display panel 14, such as by pivoting the housing 35 in a side to side or vertical direction to adjust a field of view of the sensors 32 within the sensor housing 35. Alternatively, the one or more sensors may be located adjacent nearby objects such as a vehicle or other barrier or support.

The sensors of the portable roadway barrier 10 capture information related to a direction and speed of the approaching vehicle 34, and a control module 40 determines whether the approaching vehicle 34 poses a hazard based on a speed and direction of the approaching vehicle 34 using a processor in communication with the one or more sensors, and generates an alert if the processor determines that the approaching vehicle 34 poses a hazard to the safety zone adjacent the barrier.

The one or more sensors of the portable roadway barrier 10 are preferably formed of one or more of radar, LIDAR, infrared, optical cameras, and other various sensors suitable for detecting information related to an approaching vehicle 34. As shown in FIG. 11, the one or more sensors 32 may be mounted to the portable roadway barrier 10 and oriented such that the one or more sensors 32 detect vehicles as they approach the safety zone 30. The one or more sensors 32 are preferably directional, such as directional radar, such that the one or more sensors 32 detect objects within an area of interest 38. The area of interest 38 preferably includes an area adjacent the roadway barrier 10 or the safety zone 30 such that an approaching vehicle 34 is detected as the vehicle nears the roadway barrier 10 or safety zone 30. In one embodiment, the one or more sensors 32 may be existing sensors mounted to adjacent a vehicle or object located within the safety zone 30, such as an existing radar or camera mounted within an emergency response vehicle.

The one or more sensors 32 operate by transmitting a signal, such as a radio or light frequency, towards the area of interest 38, and by detecting reflected energy from the transmitted signal. Based on changes in a frequency of the reflected energy, the one or more sensors 32 may be in communication with a control module including one or more processors and algorithms executable on the control module 40 to determine a speed and direction of the oncoming vehicle 34 entering the area of interest 38.

Figure 13:
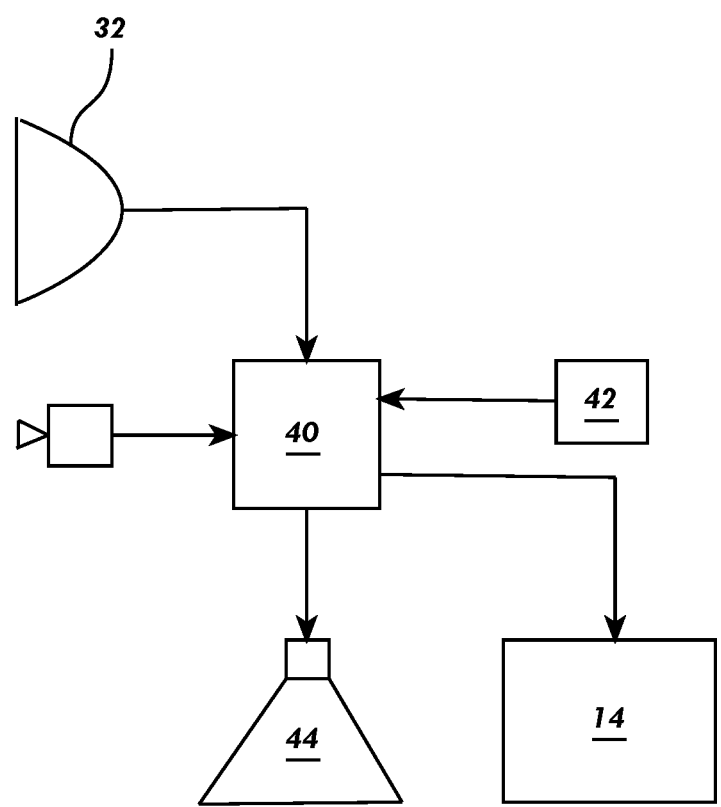
FIG. 13 is a diagram of a control module and sensors of a portable roadway barrier according to one embodiment of the disclosure.

Referring now to FIG. 13, signals detected by the sensor 32 are transmitter to the control module 40 which is in communication with the sensor 32. The control module 40 may include a processor and a computer readable storage medium, and receives power from a power source 42 such as a battery or external power source. For example, the power source 42 may include a nearby vehicle, such as an emergency response vehicle, or other known power sources such as solar panels or other like sources. A speaker 44 is in communication with the control module for emitting an audible alert.

Signals detected by the sensor and transmitted to the control module are analyzed to determine a speed and direction of the oncoming vehicle 34. Various factors may be stored on the control module, such as an estimated coefficient of friction for a particular surface or roadway; other estimated environmental conditions and estimation for driver reaction time. These various factors along with closing speed and direction of the oncoming vehicle are calculated by the control module 40 and based on that information an estimated path and stopping distance of the vehicle 34 are determined. If the control module 40 determines that the direction and estimated stopping distance of the approaching vehicle 34 indicate a potential collision or dangerous proximity to the safety zone 30, the control module 40 activates the speaker 44 to create an audible alert.

In one particular embodiment, at least one of the one or more sensors is a camera having a field of view that is preferably aligned with the area of interest 38 such that the camera captures images related to traffic approaching the roadway barrier 10 and safety zone 30 and transmits those images to the control module 40. An algorithm on the control module 40 analyzes images transmitted from the camera and detects a presence of one or more roadway markings such as lane lines, center lines, and other markings on a roadway. The algorithm on the control module 40 also analyzes and detects any moving vehicles as they approach the roadway barrier 10 and safety zone 30. Data related to an approaching vehicle's speed and direction, some of which may be detected by a second sensor 32, are analyzed and a predicted path of the approaching vehicle is determined.

When at least one or more of the sensors is a camera configured to detect roadway markings and an approaching vehicle, the control module 40 of the barrier may evaluate information related to the roadway markings such as curvature of the road. When a moving vehicle is detected within a field of view of the camera, the control module 40 analyzes a position of the moving vehicle relative to the roadway markings throughout the curve in the road. If the vehicle's speed and direction are determined to follow the marking of the road, an alert may not be generated on the barrier 10. However, if the control module 40 analyzes a position of the moving vehicle relative to the roadway markings and determines that the vehicle is out of position, such as by crossing over a roadway marking along a side of the road where the barrier 10 is located, an alert may be generated on the barrier 10 to warn anyone in proximity to the barrier that the approaching vehicle may pose a hazard.

The barrier 10 may further include a communications module for communicating with one or more external devices, such as a personal computer, portable device, or other remote device via a wired or wireless communication protocol. When the control module 40 generates an alert, the control module may further transmit data to the one or more external devices via the communications module to alert of a hazard detected by the barrier 10, thereby alerting entities outside of the safety zone that a hazard has been detected. The communications module may further transmit data to the one or more external devices, such as video and other data captured by the one or more sensors.

Other optional sensors in communication with the control module 40 include one or more ambient sensors configured to detect environmental conditions and a global positioning system module ("GPS") for determining a position of the roadway barrier 10. When determining whether a vehicle may enter the safety zone 30, data related to environmental conditions such as rain or temperature may be evaluated. Additionally, a speed limit of a roadway where the safety zone 30 is located may be determined based on a detected location of the roadway barrier 10 and known speed limits of the particular location. An approaching vehicle may be further determined to pose a hazard if a detected speed of the approaching vehicle is determined to substantially exceed a known speed limit of the location of the roadway barrier 10. The speed of the vehicle may be further analyzed based on detected ambient conditions, such as whether rain or other atmospheric conditions exist. If rain is detected, a vehicle's speed that is lower in relation to a known speed limit may be considered dangerous that the same speed in dry conditions.

A safety zone 30 may be determined based on an area adjacent to the roadway barrier having predetermined dimensions. For example, a safety zone 30 may be defined as an area that has a designated width and length that is immediately adjacent to the roadway barrier 10. Such area may be defined based on a size required for parking an emergency vehicle adjacent to the roadway barrier 10. The control module 40 may receive data related to a desired size of a safety area 30, such as dimensions related to a construction zone adjacent to the roadway barrier 10. The control module 40 may store various pre-configured safety zones corresponding to sizes of common emergency vehicles or construction zones or, alternatively, a user may manually input dimensions of a desired safety zone to be stored on the computer readable storage medium of the control module 40. The safety zone is stored on the computer readable storage medium of the control module and evaluated relative to measured data relating to a speed and direction of an approaching vehicle to allow the control module 40 to determine whether a vehicle may enter or pass in dangerous close proximity to a safety zone.

In one embodiment, the roadway barrier may include a second sensor oriented to capture data within a field of view 45 that extends towards the safety zone 30, as illustrated in FIG. 12. The second sensor may include one or more of radar, LIDAR, camera, and other various sensors suitable for detecting objects adjacent to the roadway barrier 10 and within the safety zone 30. The control module 40 receives data from the second sensor related to objects within the safety zone 30 and may either alter a size of the safety zone 30 or establish a designated safety zone based on a location of objects in proximity to the roadway barrier 10. For example, in one embodiment the second sensor may be a camera configured to optically recognize a presence of a vehicle or person adjacent to the roadway barrier 10, such as a person exiting a vehicle stopped within the safety zone 30. If a person or object is determined to be along an edge of the safety zone or immediately outside of the safety zone 30, the control module 40 may alter a size of the safety zone 30 stored in the control module 40 such that the safety zone 30 now extends to include a location of the person or object. If the control module 40 thereafter receives data related to an approaching vehicle, the control module 40 will determine whether the approaching vehicle will enter the newly sized safety zone 30 based on a speed and direction of the approaching vehicle.

In one embodiment, the barrier may not be active or emit an alert unless an object such as a person or vehicle are detected by the second sensor oriented to capture information related to a person or object adjacent the barrier 10 and determined to be within the safety zone. In this example, a safety zone may be formed of a cross walk across a roadway, with one of the sensors oriented to capture any movement of a person or object within the cross walk. If the sensor of the barrier does not detect any person or object on the cross walk, then the barrier may be substantially deactivated such that no alert is generated when a vehicle approaches the safety zone. When the barrier does detect a person or object within the safety zone, the barrier may be subsequently activated such that any approaching vehicle determined to enter the safety zone while a person or object is within the safety zone will generate an alert on the barrier.

In another embodiment, the roadway barrier 10 is substantially integrated with a vehicle, such as an emergency vehicle that is regularly positioned along a side of a road that includes traffic passing nearby. Examples of suitable emergency vehicles include police vehicles, fire trucks, ambulances, construction vehicles, and other like vehicles that may be stationary along a side of a road. The control module 40 and one or more sensors are mounted to the vehicle, with the sensors preferably being mounted in a front of the vehicle adjacent a windshield or a rear of the vehicle. The display may be attached to the vehicle toward a direction of approaching traffic or, alternatively, may be removable from the vehicle and placed adjacent the vehicle. When the vehicle becomes stationary, a safety zone may be designated around the stationary vehicle along with a desired buffer zone around the vehicle such that if any approaching traffic is estimated to enter the safety zone and surrounding buffer an alert will be generated on the display.

In operation, the portable roadway barrier 10 is transported to a desired area and may be carried by a vehicle, such as an emergency response vehicle or construction vehicle. When the portable roadway barrier 10 is in a transportable configuration, the reflective panel 12 is folded adjacent the display 18 of the dynamic display panel 14, and the optional tripod base is substantially collapsed, thereby minimizing a size of the barrier 10. When the desired area is reached, the portable roadway barrier 10 may be transformed into a substantially deployed configuration such that the reflective panel 12 and the dynamic display panel 14 are visible to approaching traffic. The portable roadway barrier 10 may be deployed in various configurations, such as a stand-alone barrier including the reflective panel 12 and base 16, or by securing the dynamic display panel 14 to existing barriers. Alternatively, the dynamic display panel 14 may be attached to a vehicle, such as an emergency response vehicle.

The portable roadway barrier 10 is preferably deployed adjacent the safety zone 30 and oriented such that the one or more sensors 32 of the portable roadway barrier 10 are directed towards an area of approaching traffic. When deployed, a user may designate one of either a predetermined visual indicator on the dynamic display panel 14, such as directional arrows or pre-configured messages, or alternatively may create a custom visual indicator or message to be displayed toward approaching vehicles.

After being deployed, the one or more sensors 32 monitor any approaching traffic and the control module 40 continuously determines whether approaching traffic may enter or pass within an unsafe distance of the safety zone adjacent the barrier 10. If the control module 40 determines that an approaching vehicle poses a hazard, an audible alert is emitted from the speaker 44 to warn users near the portable roadway barrier 10 of the approaching hazard. The control module 40 receives data from the one or more sensors related to a speed and direction of travel of an approaching vehicle to determine whether the vehicle will pass in dangerous proximity to the safety zone adjacent the barrier. The control module 40 may further receive data from one or more sensors having a field of view directed towards the safety zone to determine whether an object is present in the safety zone and a location of objects within the safety zone to determine whether a path of an approaching vehicle will pass in dangerous proximity to the objects within the safety zone. If the control module 40 determines that an approaching vehicle will pass in dangerous proximity to the objects within the safety zone then the control module may designate that approaching vehicle as a hazard and thereafter generate an alert. In one embodiment, the control module may further activate a visual alert on the dynamic display panel 14, such as rapid flashing or other alert to attempt to warn a driver of the approaching vehicle that a collision or unsafe proximity to the safety area 30 may occur.

In one example, the roadway barrier 10 may be used with an emergency vehicle such as a police vehicle. When a police vehicle is required to stop along a side of a road, it is desired to warn a person in proximity to the vehicle of an unsafe approaching traffic condition, such as an approaching vehicle that may collide with the police vehicle or pass within an unsafe distance of the police vehicle. After the police vehicle becomes stationary, the roadway barrier 10 may be deployed behind the police vehicle such that the barrier 10 is between the police vehicle and any approaching traffic. If the one or more sensors detect approaching traffic that is determined by the control module 40 to pose a hazard to the police vehicle, such as by the approaching traffic entering the safety zone, the roadway barrier 10 may emit one or more of an audible and visual alert to warn both the approaching vehicle and any persons located within the safety zone 30.

In another example, the roadway barrier 10 may be positioned adjacent other traffic areas, such as a cross-walk or intersection, such that the traffic areas are located within the safety zone 30 and an alert is generated if approaching traffic is determined to pose a hazard to the safety zone. While it is understood that the roadway barrier 10 is preferably portable, it is also understood that the barrier 10 may be permanently affixed to a location adjacent a traffic area.

The portable roadway barrier 10 of the present disclosure advantageously provides a roadway traffic device that is substantially portable and readily transported and deployed at a desired area. The portable roadway barrier 10 detects approaching vehicles that may pose a hazard and issues an alert if a dangerous condition is detected. Further, the portable roadway barrier 10 may be deployed adjacent the safety zone 30 without requiring additional barriers to be placed at a distance from the safety zone 30, thereby reducing an amount of time required to deploy the barrier. The portable roadway barrier 10 of the present disclosure further reduces the creation of false alarms related to alerts that are created based solely on an approaching vehicle's speed, because the barrier 10 will analyze both a speed and direction of the approaching vehicle to anticipate whether the approaching vehicle may pose a hazard to the safety zone. The barrier 10 of the present disclosure dynamically tracks approaching objects to determine whether the objects pose a hazard instead of waiting for an object to enter a designated area before an alert is generated. By determining whether the object will enter the designated area before entering the area, an earlier alert may be generated thereby providing more time for persons within the area to avoid an approaching hazard.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A roadway barrier comprising:
    a control module comprising at least one processor, a computer readable storage medium, and executable instructions stored on the computer readable storage medium;
    a display including a dynamic display panel housed within a case, the display in communication with the control module;
    at least one sensor in communication with the control module for measuring data related to at least a speed, distance, and direction of a vehicle, the sensor selected from the group consisting of radar, LIDAR, or a camera, the at least one sensor oriented to measure data related to an approaching vehicle;
    wherein the roadway barrier is positioned adjacent a safety zone such that the at least one sensor is oriented in a direction to detect traffic approaching the adjacent safety zone;
    wherein the control module receives data from the at least one sensor related to a speed and direction of an approaching vehicle and determines, based on a speed, distance, and direction of the vehicle whether the vehicle is estimated to enter the safety zone adjacent the portable roadway barrier; and
    wherein when the control module determines that an approaching vehicle will enter the safety zone adjacent the portable roadway barrier, the control module activates a visual alert on the display towards a driver of the approaching vehicle.

2. The portable roadway barrier of claim 1, further comprising:
    a detachable reflective panel including a reflective design hingedly attached to the case of the display,
    wherein in a deployed configuration the reflective design of the reflective panel is displayed in a direction of an approaching vehicle, and
    wherein in a closed configuration the reflective panel is folded about the hinge such that the reflective panel substantially covers the display of the portable roadway barrier.

3. The portable roadway barrier of claim 2, further comprising a collapsible base for supporting the portable roadway barrier.

4. The portable roadway barrier of claim 1, further comprising a mount formed on the case of the display configured to attach the display to an existing roadway barrier.

5. The portable roadway barrier of claim 1 further comprising:
    a camera having a field of view oriented toward traffic approaching the portable roadway barrier, and
    an algorithm on the control module for detecting one or more roadway markings and approaching vehicles within the field of view of the camera and determining whether the approaching vehicle is estimated to enter the safety zone based on a path of an approaching vehicle relative to the one or more roadway markings.

6. The portable roadway barrier of claim 1, further comprising:
    an ambient conditions sensor for measuring data related to weather conditions, wherein the control module further determines whether the approaching vehicle is estimated to enter the safety zone based on measured weather conditions.

7. The portable roadway barrier of claim 1, wherein the one or more sensors are attached to the case of the display within a sensor housing.

8. The portable roadway barrier of claim 1, wherein the one or more sensors and the control module are affixed to an emergency vehicle in proximity to the portable roadway barrier.

9. The portable roadway barrier of claim 1, wherein the display is affixed to an exterior of the emergency vehicle.

10. The portable roadway barrier of claim 1, further comprising a speaker in communication with the control module, wherein when the control module determines that the vehicle is estimated to enter the safety zone adjacent the portable roadway barrier an audible alert is emitted from the speaker.

11. The portable roadway barrier of claim 1 further comprising:
    a second sensor oriented towards the safety zone such that the second sensor collects data related to a position of one or more objects in proximity to the roadway barrier, the one or more objects selected from the group consisting of one or more traffic barriers, one or more vehicles, one or more people, or roadway markings;
    wherein the control module further receives data related to a position of the one or more objects in proximity to the roadway barrier and further determines, based on a position of the one or more objects in proximity to the roadway barrier whether the vehicle is estimated to collide with the one or more objects in proximity to the roadway barrier.

12. The roadway barrier of claim 1, wherein the control module determines whether an approaching vehicle poses a hazard based on a speed of the approaching vehicle relative to a known speed limit of the road.

13. The roadway barrier of claim 1, wherein:
the at least one sensor is mounted to a stationary emergency response vehicle, the stationary emergency response vehicle located in proximity to the roadway barrier and within the safety zone;
the control module receives data from the at least one sensor mounted to the stationary emergency response vehicle related to a speed and direction of an approaching vehicle and determines, based on a speed, distance, and direction of the vehicle whether the vehicle is estimated to pass within an unsafe distance from the stationary emergency response vehicle.

14. The roadway barrier of claim 1 wherein the processor of the control further determines whether the vehicle is estimated to enter the safety zone based on environmental factors stored on the computer readable storage medium of the controller, the environmental factors selected from the group consisting of an estimated coefficient of friction and driver reaction time.

15. A method of detecting an unsafe traffic condition comprising:
providing a safety zone adjacent a roadway;
providing a roadway barrier adjacent the safety zone, the roadway barrier including:
one or more sensors for detecting data related to a speed and direction of a vehicle approaching the safety zone and
a display including a dynamic display panel oriented towards a driver of an approaching vehicle;
transmitting the data related to an approaching vehicle to a control module in communication with the one or more sensors of the roadway barrier;
determining whether the approaching vehicle will enter the safety zone based on the detected speed and direction of the approaching vehicle; and
creating an alert on the display in response to a determination that the approaching vehicle will enter the safety zone, the alert displayed towards the driver of the approaching vehicle.

16. A portable roadway barrier comprising:
a dynamic display panel including a case and a display for providing a visual alert, the case including a hinge attached along an edge of the case;
a reflective panel attached to the hinge of the case of the dynamic display panel;
a collapsible base for supporting the dynamic display panel and the attached reflective panel;
a speaker positioned within, attached to, or adjacent the dynamic display panel; and
one or more sensors adjacent the portable roadway barrier for detecting a speed and direction of an approaching vehicle, the one or more sensors selected from the group consisting of radar, LIDAR, or a camera;
a control module in communication with the one or more sensors, the control module comprising at least one processor, a computer readable storage medium, and executable instructions stored on the computer readable storage medium;
wherein in a portable configuration the reflective panel folds adjacent to the display of the dynamic display panel, and in a deployed configuration the dynamic display panel and reflective panel provide a reflective barrier panel and directional/messaging visual display panel to an oncoming vehicle; and
wherein when the portable roadway barrier is in a deployed configuration:
one or more sensors affixed to the portable roadway barrier determine that the speed and direction of the oncoming vehicle pose a hazard, an audible and visual alert is emitted by the speaker and the dynamic display panel to alert a person in proximity to the portable barrier that a hazardous condition exists.

* * * * *